United States Patent Office

2,856,525
Patented Oct. 14, 1958

2,856,525

PULSE SHAPER

Samuel Lubkin, Bayside, N. Y., assignor to Underwood Corporation, New York, N. Y., a corporation of Delaware Application July 9, 1954, Serial No. 442,276

4 Claims. (Cl. 250—27)

This invention relates to electronic circuits and more particularly to electronic circuits which shape pulses.

In many electronic fields there is a need for apparatus for reshaping pulses which have become distorted due to processing in circuits. For example, in the radar and the digital computer art, a rectangular pulse sent through a delay line loses its shape and broadens at its base. Another example is a pulse which when recorded on a magnetic drum widens magnetically due to the fringing of flux lines at the poles of the recording head and to the motion of the drum during the interval in which the pulse is applied.

The problem of providing a pulse shaper becomes more complicated when the pulse shaper must respond to input pulses of varying amplitudes. Quite frequently, when input pulses of this nature are to be reshaped, varying amounts of delay occur between the receipt of a pulse and the generation of a shaped output pulse. This characteristic can be particularly noted if the input pulses are received in cyclical fashion so that the output pulses are characterized by "jitter" which simply means that the output pulses do not occur at precise time intervals. This timing difficulty is also inherent if the input pulses received by the pulse shaper are received at random time intervals.

The problem of providing a satisfactory pulse shaper is further complicated if the input pulses are required to be shaped into narrow rectangular pulses having minimum rise times.

Accordingly it is an object of the invention to provide an improved pulse shaper.

A further object of the invention is to provide an improved pulse shaper which is virtually non-responsive to the amplitudes of input pulses and produces output pulses substantially without jitter.

Another object of the invention is to provide an improved pulse shaper which responds to distorted input pulses by producing narrow output pulses having a fast rise time.

Briefly, a pulse shaper in accordance with the invention comprises differentiating circuits for successively differentiating an input pulse two times, a circuit for inverting the output waveform of the differentiating circuits and a circuit for gating the inverted waveform with the original input pulse.

An advantage of the invention is that arbitrarily distributed positive and negative input pulses of varying amplitudes may be shaped.

A further advantage of the invention is that no standard pulses are required to provide the proper shape for output pulses.

Other advantages are that a pulse shaper in accordance with the invention is simple and inexpensive, has relatively no delay in responding to the input pulses, and produces well-defined output pulses.

The invention will be more readily understood from the following description taken together with the accompanying drawings in which.

Figure 1:
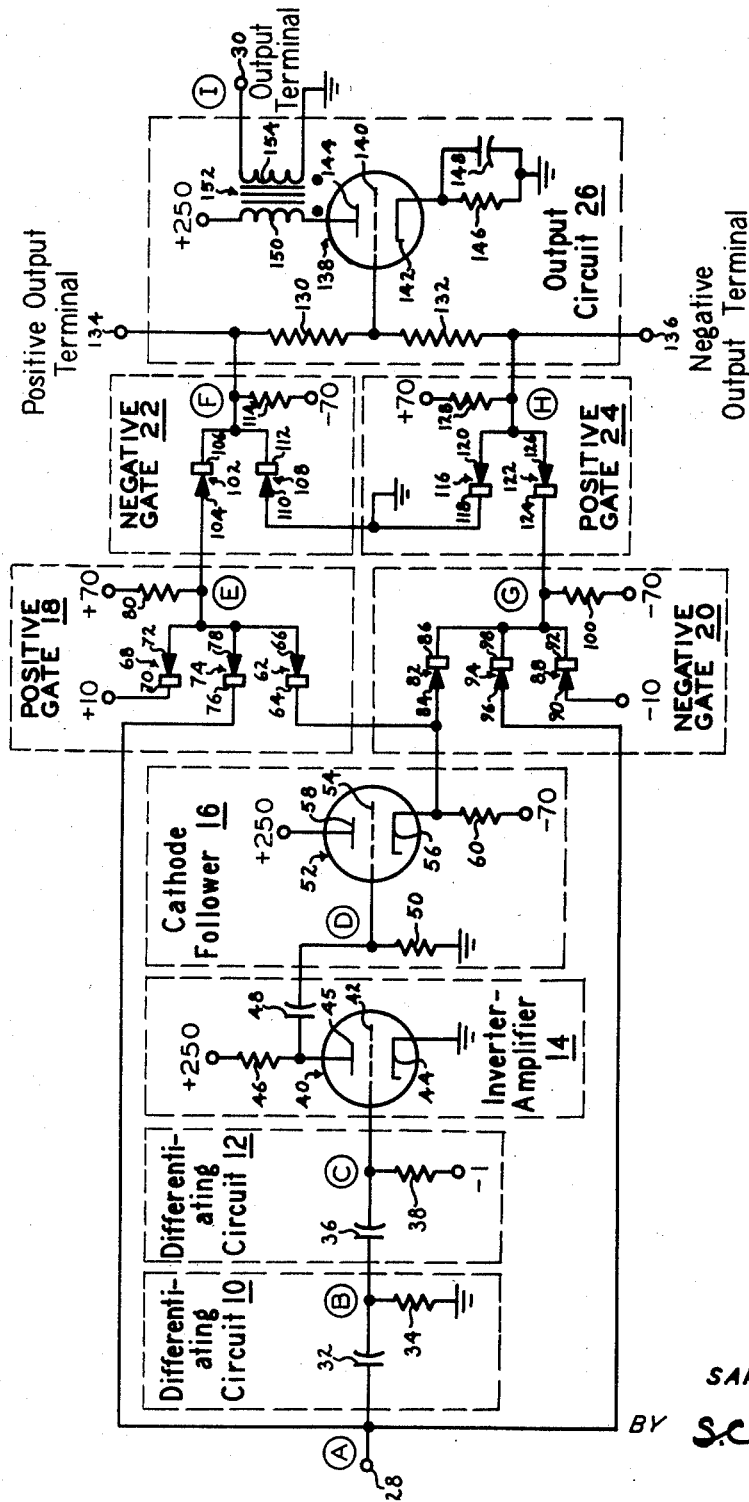
Fig. 1 is a schematic diagram of the preferred embodiment of the invention which is responsive to positive and negative input pulses of varying amplitudes.

A pulse shaper 8 in accordance with the invention is shown in Fig. 1. The pulse shaper 8 functions to receive poorly shaped pulses of positive or negative polarity at an arbitrary rate and to produce narrow rectangularly shaped output pulses which have relatively fast rise times.

The pulse shaper 8 comprises the differentiating circuits 10 and 12, the inverter-amplifier 14, the cathode follower 16, the positive gates 18 and 24, the negative gates 20 and 22, and the output circuit 26. Input pulses are received via the terminal 28 and output pulses are transmitted from the output terminal 30. Positive output pulses appear at the positive output terminal 134 and negative output pulses appear at the negative output terminal 136.

Briefly, an output pulse is twice differentiated by the differentiating circuits 10 and 12. The resultant waveform is inverted and amplified by the inverter-amplifier 14 and is passed via the cathode follower to the positive gate 18 and negative gate 20. The positive gate 18 and negative gate 22 cooperate to pass only positive rectangular pulses to the positive output terminal 134. The negative gate 20 and positive gate 24 cooperate to pass only negative rectangular pulses to the negative output terminal 136. The output circuit 26 combines the positive and negative rectangular pulses into a single signal which is transmitted via the output terminal 30.

The differentiating circuit 10 includes a capacitor 32 which couples one end of a resistor 34 to the terminal 28. The other end of the resistor 34 is grounded. The differentiating circuit 12 includes a capacitor 36 which couples one end of a resistor 38 to the junction of the capacitor 32 and the resistor 34. The other end of the resistor 38 is connected to a minus one volt supply.

The inverter-amplifier 14 includes a triode 40 having a grid 42 connected to the junction of the capacitor 36 and the resistor 38. The triode 40 also includes a cathode 44 which is grounded and an anode 45 which is coupled via a resistor 46 to a plus two hundred and fifty volts supply.

A capacitor 48 couples the anode 45 to one end of a resistor 50. The other end of the resistor 50 is connected to ground.

The cathode follower 16 includes the triode 52 which has a grid 54 connected to the junction of the capacitor 48 and the resistor 50. The triode 52 also includes a cathode 56 and an anode 58. The anode 58 is directly coupled to a plus two hundred and fifty volts supply. The cathode 56 is connected via a resistor 60 to a minus seventy volts supply.

The positive gate 18 includes a crystal diode 62. The crystal diode 62 includes the anode 66 and the cathode 64 which is connected to the cathode 56.

The positive gate 18 also includes the crystal diode 68 having a cathode 70 connected to a plus ten volts supply and an anode 72. A third crystal diode 74 is included in the positive gate 18. Crystal diode 74 has a cathode 76 connected to the terminal 28 and an anode 78. The anodes 66, 72 and 78 are coupled via a resistor 80 to a plus seventy volts supply.

The positive gate 18 functions to pass the most negative signal present at one of the cathodes 64, 70 and 76. This result is achieved because the anode associated with the cathode having the most negative potential tends to assume the potential level of that cathode and to bring the remaining anodes to that potential level. Thus, the other crystal diodes are cut off so that the cathode having the most negative potential level determines the output potential level of the positive gate 18.

The negative gate 20 includes the crystal diode 82 having an anode 84 connected to the cathode 56 of the triode 52. The crystal diode 82 also includes the cathode 86. The negative gate 20 further comprises the crystal diode 88 having a cathode 92 and an anode 90 connected to a minus ten volts supply. Also included in the negative gate 20 is a crystal diode 94 having a cathode 98 and an anode 96 connected to the terminal 28. The cathodes 86, 92 and 98 are connected via a resistor 100 to a minus seventy volts supply.

The negative gate 20 functions to pass the most positive signal present at one of the anodes 84, 90 and 96. This result is achieved because the cathode associated with the anode having the most positive potential tends to assume the potential level of that anode and bring the remaining cathodes of the negative gate 20 to that potential level. Thus the remaining crystal diodes are cut off so that the anode having the highest positive potential level determines the potential level present at the cathodes 86, 92 and 98.

The negative gate 22 includes the crystal diode 102 having an anode 104 connected to the anodes 66, 72 and 78 of the positive gate 18. The crystal diode 102 also includes a cathode 106. The negative gate 22 further comprises a crystal diode 108 having a cathode 112 and an anode 110 connected to ground. The cathodes 106 and 112 are connected via a resistor 114 to a minus seventy volts supply. The negative gate 22 functions in the manner of the negative gate 20 to pass the most positive signal present at one of the anodes 104 and 110.

The positive gate 24 includes a crystal diode 116 having a cathode 118 which is grounded and an anode 120. The positive gate 24 also includes the crystal diode 122 having a cathode 124 connected to the cathodes 86, 92 and 98 of the negative gate 20 and also has an anode 126. The anodes 120 and 126 are connected via a resistor 128 to a plus seventy volts supply.

The junction of the cathodes 106 and 112 is connected to one end of a resistor 130 and the junction of the anodes 120 and 126 is connected to one end of a resistor 132. The other ends of the resistors 130 and 132 are connected together.

The junction of the resistor 130 and the cathodes 106 and 112 is connected to a positive output terminal 134. The junction of the resistor 132 and the anodes 120 and 126 is connected to a negative output terminal 136.

The output circuit 26 includes a triode 138 having a grid 140 connected to the junction of the resistors 130 and 132. The triode 138 also includes a cathode 142 and an anode 144. The cathode 142 is connected via a self-biasing resistor 146 to ground. The resistor 146 is bypassed by a capacitor 148. The anode 144 is connected via the primary winding 150 of a transformer 152 to a plus two hundred and fifty volts supply. A secondary winding 154 of transformer 152 is coupled between the output terminal 30 and ground.

Figure 2:
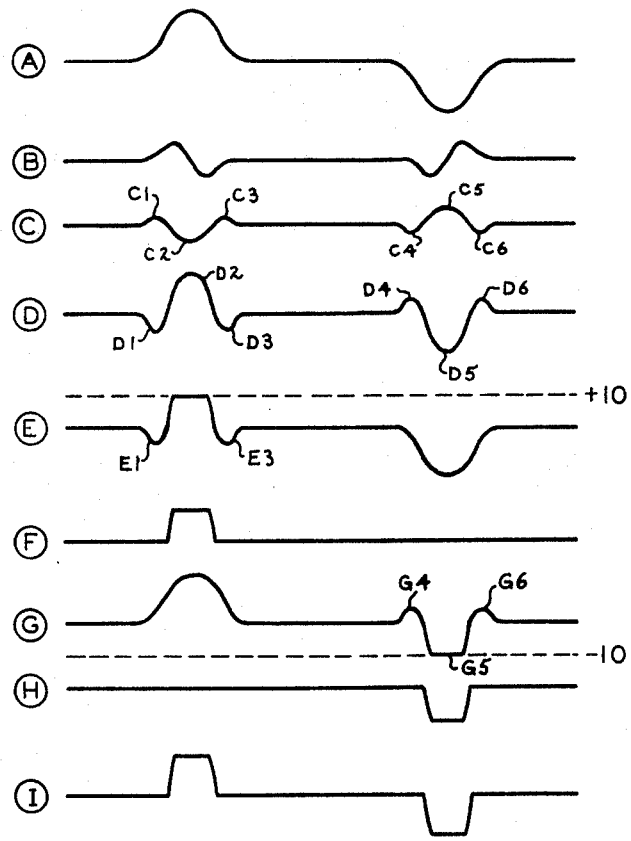
Fig. 2 is a waveform diagram of signals which may occur in the apparatus of Fig. 1.

The operation of the pulse shaper 8 will next be described in detail with reference to the waveforms illustrated in Fig. 2. For the purpose of indicating how these circuits operate on pulses of positive and negative polarity, positive and negative pulses are indicated as being received by the terminal 28. It should be noted that successive positive pulses or successive negative pulses can also be treated by the pulse shaper 8 and further that these pulses may occur at random time intervals.

When a waveform A is received via the terminal 28, the waveform is differentiated by the differentiating circuit 10 to yield waveform B. It will be noted that the maximum magnitudes of waveform B correspond to the regions of greatest rate of change of waveform A and that the points of zero magnitude of waveform B correspond to the regions of zero rate of change of waveform A.

Waveform B is differentiated by differentiating circuit 12 and waveform C results in accordance with the rules discussed in regard to waveform B. It will be noted with respect to the portions C2 and C5 of waveform C that these portions are apparently inverted from the pulses of waveform A and that the portions C2 and C5 of waveform C are preceded and trailed by smaller portions C1, C3, C4 and C6 having a polarity which is opposite to the polarity of the portions C2 and C5.

The output of the differentiating circuit 12, namely waveform C, is transmitted to the inverter-amplifier 14 which inverts the polarity of waveform C in a well known manner and amplifies the magnitudes of waveform C. Waveform D is the resultant output signal of the inverter-amplifier 14.

Waveform D is fed to the cathode follower 16 which operates to provide a low impedance power source for the crystal diodes of the positive gate 18 and the negative gate 20 and to establish a D.-C. reference voltage level. The output signal from the cathode follower 16 is fed to the positive gate 18 along with the waveform A which is received by the positive gate 18 from the terminal 28.

Since the positive gate 18 functions to pass the most negative signal present at one of its cathodes 64, 70 and 76, the positive gate 18 will pass through the most negative portions of the waveforms A and D until a maximum amplitude of plus ten volts is achieved due to the clamping action of the crystal diode 68.

Unless a portion of the first pulse of waveform A is more negative than the portions D1–3 of the waveform D, the waveform D will control the signal passed by the positive gate 18 during the receipt of the first pulse. The maximum amplitude of the signal passed by the positive gate 18 as previously noted, will be plus ten volts.

In regard to the second pulse of the waveform A and portions D4–6 of waveform D, the second pulse of the waveform A will control the shape of the pulse passed by the positive gate 18 and thus the pulse will be entirely negative. The entire signal passed to the negative gate 22 as shown by waveform E will be a combination of the portions D1–3 of waveform D with a maximum amplitude of plus ten volts and the second or negative pulse of waveform A. It should be noted that portions D4 and D6 are deleted.

The negative gate 22, as previously mentioned, functions to pass the most positive signal present at its anodes 104 and 110. Since the anode 110 is grounded, the negative gate 22 passes the above-ground portion of the signal passed by positive gate 18. This operation eliminates the second (negative) pulse passed by positive gate 18, and further eliminates the portions E1 and E3 passed by the positive gate 18. The resultant output of the negative gate 22 is waveform F which can be transmitted from the pulse shaper 8 via the positive output terminal 134.

It will be noted that waveform F consists of a narrow rectangularly shaped pulse coinciding in time with the positive pulse of waveform A and further that the pulse of waveform F has a considerably better rise time than the positive pulse of waveform A.

The output of the cathode follower 16 is also fed to the negative gate 20 along with the waveform A which is received by the negative gate 20 from the terminal 28. The negative gate 20, as previously explained, functions to pass the most positive signal present at one of its anodes 84, 90 and 96 and will pass a signal whose maximum negative potential does not exceed minus ten volts due to the clamping action of the crystal diode 88.

Because the negative gate 20 passes the most positive signal, the first pulse passed by the negative gate 20 will take the shape of the first pulse of waveform A and the second pulse passed by the negative gate 20 will take the shape of portions D4–6 of the waveform D except that the second pulse will be clipped at minus ten volts as shown in waveform G.

The output of the negative gate 20 is fed to the positive gate 24 which functions to pass only the most negative signal received at one of its cathodes 118 and 124. It should be noted that since the cathode 118 is connected to ground that signals whose potential levels are more positive than ground will not be passed. Thus the first pulse passed by the negative gate 20 is blocked at the positive gate 24 as this pulse is entirely positive in polarity. The second pulse passed by the negative gate 20 consists of the clipped portion D5 of waveform D. The positive swinging portions G4 and G6 preceding and following the portion G5 are deleted. The positive gate 24 therefore passes waveform H to the negative output terminal 136.

Terminals 134 and 136 may be used to tap waveforms F and H, respectively, from the pulse shaper if output pulses of one polarity only are desired. Waveforms F and H are combined into one signal by arrangement of the resistors 130 and 132 and the resulting signal is fed to the grid 140 of the triode 138.

The triode 138 is designed to have an amplification to compensate for the loss in magnitude caused by the voltage dividing action of the resistors 130 and 132. The triode 138 may also be utilized in such a fashion as to produce any magnitude output desired.

The output terminal 30 is coupled to the triode 138 via the transformer 152 to restore the signal fed to the grid 140 to its original polarity. Thus the transformer 152 prevents inversion of the signal due to the operation of the triode 138. A load may be coupled from the output terminal 30 to ground.

It should be noted in connection with the pulse shaper 8 that its function is primarily dependent upon the shape of the input waveform as contrasted to many other circuits which are dependent upon the magnitude of the waveform. Thus changes in magnitude of the input pulses which might affect other circuits have no effect on the pulse shaper 8 unless the shape of the input pulse is changed.

It should be further noted that input pulses are used for gating the output of the cathode follower 16 to exclude from the output waveform the smaller pulses of waveform D which are undesirably of a polarity opposite to the polarity of the major pulses.

Thus, in accordance with the invention, a pulse shaper has been shown which is virtually non-responsive to the amplitudes of input pulses and which produces narrow output pulses having a fast rise time.

There will be now obvious to those skilled in the art many modifications and variations utilizing the principles set forth and realizing many or all of the objects and advantages of the circuits described but which do not depart essentially from the spirit of the invention.

What is claimed is:

1. A pulse shaper comprising differentiating circuits for twice differentiating an input pulse to produce a differentiated waveform, an inverter-amplifier coupled to said differentiating circuits for inverting the differentiated waveform to produce an inverted waveform, a cathode follower coupled to said inverter-amplifier for establishing a direct current level for the inverted waveform, first gating means coupled to said cathode follower and being responsive to the input pulse for gating the inverted waveform to form a first signal, said first gating means clipping the portion of the first signal in excess of a predetermined positive level and deleting the negative portions of the first signal, second gating means coupled to said cathode follower for forming a second signal from the input pulse and the inverted waveform, said second gating means clipping the portion of the second signal in excess of a predetermined negative level and deleting the positive portions of the second signal and means to combine the first and second signals to produce an output signal.

2. A pulse shaping circuit for an input signal having relatively wide positive going and negative going signal pulses, said shaping circuit comprising a pair of differentiating circuits in series to receive said input signal and to produce a doubly differentiated output signal therefrom, a first gating means responsive to said input signal and to the output signal of said differentiating circuits to generate a positive signal when said input signal is positive and said output signal is negative, a second gating means responsive to said input signal and to said output of said differentiating devices to generate a negative signal when said input signal is negative and said output is of positive polarity, and means to combine the signals from said two gating means to generate a signal having relatively narrow pulses corresponding to the pulses in said input signal.

3. A pulse shaper to reshape pulses appearing in an input signal, said shaper comprising a first differentiating device receiving said signal pulses, a second differentiating device in series with said first differentiating device and delivering a twice differentiated waveform corresponding to said input signal, an inverter to change the polarity of said twice differentiated waveform, a positive gating means receiving said input signal, said inverted waveform and a positive voltage to generate a first signal having a limited positive excursion when said input signal and said inverted waveform are simultaneously positive, a negative gating means receiving said input signal, said inverted waveform and a negative voltage to generate a second signal having a limited negative excursion when said input signal and said inverted waveform are simultaneously negative, and means to combine said first and second signals into an output signal which is a reshaped version of said input signal.

4. A pulse reshaper to sharpen pulses in an input signal, said reshaper comprising an input lead to which an input signal may be applied, a pair of signal differentiating devices and an inverter in a series circuit connected at one end to said lead to receive an input signal and supply an inverted twice differentiated signal, a positive clipping device receiving said input signal, said inverted signal and a positive voltage to generate a first output corresponding to the most negative of said three received supplies, a negative limiter to eliminate any negative excursions in said first output of said positive clipping device, a negative clipping device receiving said input signal, said inverted signal, and a negative voltage to generate a second output corresponding to the most positive of said three supplies, a positive limiter to eliminate any positive excursions in said second output of said negative clipping device, and a signal mixing device to combine said two clipped and limited outputs into a reshaped output signal.

References Cited in the file of this patent
UNITED STATES PATENTS

| | | |
|---|---|---|
| 1,315,539 | Carson | Sept. 9, 1919 |
| 2,408,078 | Labin et al. | Sept. 24, 1946 |
| 2,438,927 | Labin et al. | Apr. 6, 1948 |
| 2,448,718 | Koulicovitch | Sept. 7, 1948 |
| 2,455,618 | Shepard | Dec. 7, 1948 |
| 2,537,589 | Johnson | Jan. 9, 1951 |
| 2,557,729 | Eckert | June 19, 1951 |
| 2,648,766 | Eberhard | Aug. 11, 1953 |
| 2,654,028 | Levy | Sept. 29, 1953 |
| 2,657,258 | Hester | Oct. 27, 1953 |
| 2,717,999 | Lewinstein | Sept. 13, 1955 |